US012210750B2

United States Patent
Reina et al.

(10) Patent No.: US 12,210,750 B2
(45) Date of Patent: Jan. 28, 2025

(54) EFFECTIVE ACCESS COUNT BASED MEDIA MANAGEMENT

(71) Applicant: Micron Technology, Inc., Boise, ID (US)

(72) Inventors: Vincenzo Reina, Munich (DE); Francesco Lupo, Munich (DE)

(73) Assignee: Micron Technology, Inc., Boise, ID (US)

( * ) Notice: Subject to any disclaimer, the term of this patent is extended or adjusted under 35 U.S.C. 154(b) by 20 days.

(21) Appl. No.: 17/459,808

(22) Filed: Aug. 27, 2021

(65) Prior Publication Data

US 2023/0060913 A1    Mar. 2, 2023

(51) Int. Cl.
*G06F 3/06* (2006.01)

(52) U.S. Cl.
CPC .......... *G06F 3/0616* (2013.01); *G06F 3/0653* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 6,732,221 B2 | 5/2004 | Ban | |
| 9,665,481 B2 | 5/2017 | Tan | |
| 10,635,324 B1* | 4/2020 | Klein | G06F 3/0653 |
| 11,010,054 B1* | 5/2021 | Himelstein | G06F 3/0685 |
| 2008/0183947 A1 | 7/2008 | Shone et al. | |
| 2010/0205356 A1 | 8/2010 | Mukaida et al. | |
| 2015/0378800 A1* | 12/2015 | Suzuki | G06F 3/064 714/49 |
| 2016/0098216 A1* | 4/2016 | Huang | G06F 11/073 714/37 |
| 2016/0170682 A1* | 6/2016 | Bakshi | G06F 3/0688 711/103 |
| 2016/0350183 A1* | 12/2016 | Lien | G11C 7/20 |
| 2016/0364175 A1* | 12/2016 | Yang | G06F 3/0647 |
| 2017/0285970 A1* | 10/2017 | Li | G06F 3/0616 |
| 2017/0308431 A1* | 10/2017 | Otterstedt | G06F 11/1012 |
| 2018/0004415 A1* | 1/2018 | Lee | G11C 16/3418 |
| 2020/0202965 A1* | 6/2020 | Merritt | H03L 7/0995 |

* cited by examiner

*Primary Examiner* — Yaima Rigol
*Assistant Examiner* — Alexander J Yoon
(74) *Attorney, Agent, or Firm* — Brooks, Cameron & Huebsch, PLLC

(57) ABSTRACT

A method includes determining respective health characteristic values of blocks of non-volatile memory cells, determining, based on the respective health characteristic values and at least one effective health factor of the blocks of the non-volatile memory cells, effective respective health characteristic values of the blocks of non-volatile memory cells, and based on the effective respective health characteristic values, performing a media management operation involving a block of non-volatile memory cells of the blocks of non-volatile memory cells having an effective respective health characteristic value that is greater than a health criterion.

18 Claims, 5 Drawing Sheets

EFFECTIVE ACCESS COUNT BASED MEDIA MANAGEMENT

TECHNICAL FIELD

Embodiments of the disclosure relate generally to memory sub-systems, and more specifically, relate to effective access count based media management.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
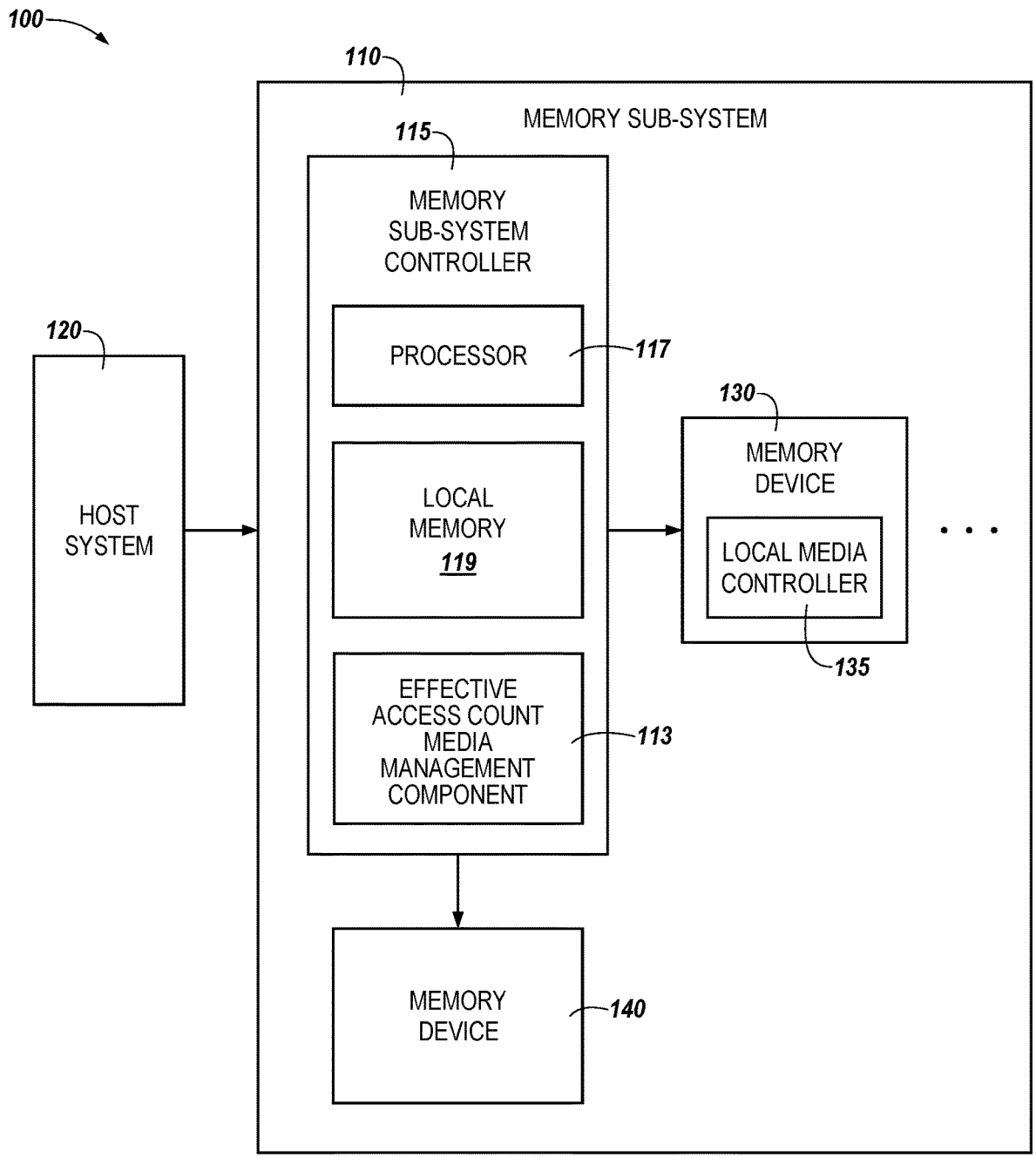
FIG. 1 illustrates an example computing system that includes a memory sub-system in accordance with some embodiments of the present disclosure.

Aspects of the present disclosure are directed to effective access count based media management, in particular to memory sub-systems that include an effective access count based media management component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can be written to in order to store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some memory devices employ a floating-gate architecture in which memory accesses are controlled based on a relative voltage change between the bit line and the word lines. Other examples of memory devices can employ a replacement-gate architecture that can include the use of word line layouts that can allow for charges corresponding to data values to be trapped within memory cells based on properties of the materials used to construct the word lines.

Due to characteristics inherent in memory devices (e.g., NAND memory devices), data quality in memory cells of the memory device can degrade over time. For instance, as a program-erase cycle (PEC) count of a block of memory cells (which can be referred to herein for simplicity as a "block") increases, data quality in the block can decrease. Degradation of data quality can render memory cells prone to failures. For instance, over time a threshold voltage (VT) level shift can occur. As a result of the VT level shift, a read operation performed on a memory cell experiencing the VT level shift can fail or return a corrupted or incorrect data value.

To mitigate data degradation issues, some approaches randomly select a block or select a block based on a given PEC count of the block, and then perform a block refresh involving the selected block. Performing the block refresh involving the selected block can mitigate some issues associated with data degradation. However, such block selection may not account for other inherent differences between blocks that can alter actual performance of a block. For instance, blocks generally are physically located at different locations on a die and/or in a memory device. Such differences in a physical location can lead to different data paths, different temperature profiles during manufacture and/or use of the blocks, and/or can otherwise impact performance of the blocks such as impacting a proclivity of data on the block to degrade. Similarly, different blocks can have different base performance characteristics (e.g., subsequent to a time of manufacture) and/or have different actual performance characteristics (e.g., while the block is in use over an operation lifetime of the block). Such differences in base performance characteristics and/or actual performance characteristics can also impact performance of the blocks such as impacting a proclivity of data on the block to degrade.

Further, as mentioned some approaches employ a PEC count when selecting a block in an effort to mitigate data degradation. For instance, such approaches may select a block with a relatively largest PEC count. However, as a result, an unselected block (e.g., with a lower PEC count) will not be refreshed, and thus data in the unselected block may continue to degrade at a rate that is faster than the selected block (e.g., due to differences in physical block location, accesses to the blocks due to data paths associated with accessing the blocks, temperature variations that the blocks can be subjected to during operation, etc.) and therefore result in a failed read or return of a corrupted or incorrect data value despite the unselected block having a comparatively lower PEC count than a selected block.

Moreover, it has been discovered that blocks which have undergone a memory operation (e.g., a write, read and/or erase operation) and which have undergone (e.g., subsequently undergone) a particular processing step (e.g., infrared reflow soldering, etc.) during manufacture can be particularly prone to subsequent errors. For instance, a block can be particularly prone to errors after having undergone a memory operation and subsequently undergone a processing step during manufacture and/or when the block exhibits a health characteristic value that meets (e.g., is equal to or greater than) a health criterion such as a PEC criterion.

As such, the disclosure is directed to effective access count based media management of a memory sub-system and/or a computing system. Notably, such effective access count based media management can account for differences in physical block location, differences in base and/or actual performance characteristics of blocks and therefore a memory sub-system in which the blocks are deployed, and/or whether or not a block has undergone a particular processing operation (e.g., undergone a memory operation subsequent to undergoing a particular processing operation), rather than relying solely on a given PEC count or random block selection that some approaches employ. By so doing, memory operations can be performed based on an effective health characteristic value such as an effective access count of a block, and thus can provide improved data degradation mitigation, in contrast to other approaches such as those that rely solely on PEC counts or random selection of blocks which are to be refreshed. Consequently, errors (e.g., a failed read or return of a corrupted or incorrect data value) that can occur in the approaches described above can be prevented from occurring by way of employing the techniques described herein.

Conversely, with other approaches that do not employ effective access count based media management, the memory sub-system can experience degraded performance. This degradation of performance can be undesirable, especially in critical applications and/or in applications in demanding applications in which very high memory sub-system performance is expected. Further, this degraded performance that can be exhibited in such approaches can be further exacerbated in mobile (e.g., smartphone, internet of things, etc.) memory deployments in which an amount of space available to house a memory sub-system is limited in comparison to traditional computing architectures.

Aspects of the present disclosure address the above and other deficiencies by determining respective health characteristic values (e.g., respective access count) of blocks of non-volatile memory cells, determining effective respective health characteristic values of the blocks of non-volatile memory cells, and, based on the effective respective health characteristic values, performing a media management operation involving a block of non-volatile memory cells. For instance, effective respective access counts for the blocks of non-volatile memory cells can be determined based on the respective access counts and at least one effective health factor of the blocks of the non-volatile memory cells. In this way, the respective health characteristic values such as respective access counts of the blocks of non-volatile memory cells can be adjusted (e.g., increased or decreased) based on at least one effective health factor (e.g., topology factor, a manufacturing process factor, a test factor, a run-time factor, etc.) of the blocks of the non-volatile memory cells. As used herein, an effective health factor refers to a value that modifies a respective characteristic health value. For instance, a respective characteristic health value can be multiplied by or otherwise modified by an effective health factor, as detailed herein.

In some examples, performing the media management operation involving the block of non-volatile memory cells can include performing a block refresh on the block of non-volatile memory cells. By performing aspects of effective access count based media management, as detailed herein, memory sub-system performance can be improved in comparison to other approaches such as those that rely solely on PEC counts or which randomly select blocks for performance of media management operations. Embodiments herein can be applied in mobile memory architectures to further improve the reliability of a memory sub-system deployed in a mobile computing architecture.

Some embodiments can include performing aspects of effective access count based media management to select, from dies associated with a memory device subsequent to manufacture of the plurality of dies, a sub-set of the dies for inclusion into a memory device. In this way, manufacturing yields for the dies can be increased, for instance, by selecting some dies with a lower performance characteristic (relative to other dies of the sub-set of dies). Yet, such selection of the sub-set of dies can be performed to ensure that an aggregate quality (e.g., an average quality or sum of qualities of the various dies) of the sub-set of dies meets a heath criterion and/or a performance criterion (e.g., having less than a given amount of latency, meeting criterion involving a physical location of the dies in a memory device layout, meeting criterion involving a quantity of accesses based on routing characteristics and/or execution of application that can have an effect on the performance characteristics of the dies, etc.).

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include an effective access count based media management component 113. Although not shown in FIG. 1 so as to not obfuscate the drawings, the effective access count based media management component 113 can include various circuitry to facilitate determining respective health characteristic values (e.g., access count) of blocks of non-volatile memory cells, determining effective respective health characteristic values of the blocks of non-volatile memory cells, and, based on the effective respective health characteristic values, performing a media management operation involving a block of non-volatile memory cells (e.g., a physical block of non-volatile memory cells). For instance, the effective access count based media management component 113 can perform a media management operation involving a block of non-volatile memory cells having an effective respective health characteristic value that meets a health criterion. In some embodiments, the effective access count based media management component 113 can include special purpose circuitry in the form of an ASIC, FPGA, state machine, and/or other logic circuitry that can allow the effective access count based media management component 113 to orchestrate and/or perform the operations described herein.

In some embodiments, the memory sub-system controller 115 includes at least a portion of the effective access count based media management component 113. For example, the memory sub-system controller 115 can include a processor 117 (processing device) configured to execute instructions stored in local memory 119 for performing the operations described herein. In some embodiments, the effective access count based media management component 113 is part of the memory sub-system 110, an application, or an operating system.

In a non-limiting example, an apparatus (e.g., the computing system 100) can include an effective access count based media management component 113. The effective access count based media management component 113 can be resident on the memory sub-system 110. As used herein, the term "resident on" refers to something that is physically located on a particular component. For example, the effective access count based media management component 113 being "resident on" the memory sub-system 110 refers to a condition in which the hardware circuitry that comprises the effective access count based media management component 113 is physically located on the memory sub-system 110. Similarly, the memory components (e.g., memory devices 130) can be resident on a mobile computing device. The term "resident on" can be used interchangeably with other terms such as "deployed on" or "located on," herein.

The effective access count based media management component 113 can be configured to determine respective health characteristic values such as respective PEC counts of blocks of non-volatile memory cells. As used herein, the "PEC count" generally refers to the number of times a block (e.g., a NAND block) has been accessed (e.g., programmed and/or erased), which is an indicator of block wear. For instance, PEC count of a respective block of memory cells associated with a physical block and/or a logical block can be determined, among other possibilities. In some embodiments, the PEC count can be a value that is incremented in a table such as look-up table or is otherwise stored or accessible to the memory sub-system.

As described above, the memory components can be memory dies or memory packages that form at least a portion of the memory device 130. In some embodiments, the blocks of memory cells can form one or more "superblocks." As used herein, a "superblock" generally refers to a set of data blocks that span multiple memory dies and are written in an interleaved fashion. For instance, in some embodiments each of a number of interleaved NAND memory blocks can be deployed across multiple memory dies that have multiple planes and/or pages associated therewith. The terms "superblock," "block," "block of memory cells," and/or "interleaved NAND memory blocks," as well as variants thereof, can, given the context of the disclosure, be used interchangeably.

The effective access count based media management component 113 can be further configured to determine effective respective health characteristic values such as effective respective access counts of blocks of non-volatile memory cells. For instance, the effective access count based media management component 113 can be further configured to determine an effective respective access counts based on the respective access counts and at least one effective health factor of the blocks of the non-volatile memory cells, as detailed herein.

In some embodiments, at least one effective health factor includes a topology factor, a manufacturing process factor, a test factor, a run-time factor, or any combination thereof. Each given effective health factor can have a corresponding indicator. For instance, each effective health factor can have a corresponding status of a flag, a bit pattern, a value stored in a bit, a value stored in a table or other data-storage structure, and/or any other type of indicator. For instance, a value (e.g., a "1") can indicate that a block of non-volatile memory cells has not undergone a particular type of manufacturing process, while another value (e.g., a value greater than 1) can indicate that the block of non-volatile memory cells has undergone the particular type of manufacturing process. Similarly, a value (e.g., a "1") can indicate that a block of non-volatile memory cells is not proximate to an edge or other location on a die, while another value (e.g., a value greater than 1) can indicate the block of non-volatile memory cells is proximate to an edge or other location on a die.

In some embodiments, at least one effective health factor includes a manufacturing process factor. As used herein, a "manufacturing process factor" refers to an indicator of whether a block of non-volatile memory cells and/or a die in which the block of non-volatile memory cells is included has undergone a particular manufacturing process during manufacture of the die and/or an apparatus in which the die is included. Examples of manufacturing processes include various soldering processes and/or bonding processes. The manufacturing process can employ heat, chemicals, or both, to attach or mount various components such as a die to a circuit board or other component.

In some examples, the soldering process can be an infrared (IR) reflow soldering process. The IR reflow soldering process can employ solder which is heated (to permit the solder to be become viscous/liquid) and subsequently cooled to permit that attachment of various components/circuitry using the solder. Without wishing to be bound by theory, it is believed that the heat and/or chemicals employed in a manufacturing process such as an IR reflow soldering process may make a die or block of non-volatile memory cells which has undergone the manufacturing process more susceptible to experiencing errors over an operational lifetime of an apparatus including the die or the block on non-volatile memory cells. As a result, a PEC count may not accurately reflect and actual state of the die which has undergone the manufacturing process. Thus, effective access count based media management, as detailed herein, can account for whether or not a die or block of non-volatile memory cells in the die has undergone a manufacturing process. As mentioned, status of a flag, a value stored in a bit, a value stored in a table or other data-storage structure, and/or any other type of indicator can indicate whether or not a die or block of non-volatile memory cells has undergone a manufacturing process.

In some embodiments, the manufacturing process factor can indicate whether a block of non-volatile memory cells has undergone the particular manufacturing process at a given point in time. For instance, the manufacturing process factor can indicate whether a block of non-volatile memory cells has undergone the particular manufacturing process subsequent to performance of a memory operation involving the block of non-volatile memory cells. For instance, a memory operation involving the block of non-volatile memory cells can included storage of data in the block of non-volatile memory cells of a memory component prior to manufacture or assembly of a memory array including the memory component and/or prior to inclusion of the memory component into an apparatus and/or electronic device (e.g., a mobile computing device or other type of electronic device).

In such instances, the manufacturing process factor can indicate whether a block of non-volatile memory cells has undergone the particular manufacturing process subsequent to performance of a memory operation involving the block of non-volatile memory cells. As mentioned, a die which has undergone a manufacturing process such as an IR reflow soldering process can be more susceptible to experiencing errors and thus a PEC count associated with the die may not accurately reflect and actual state of the die which has undergone the manufacturing process. Moreover, it has been discovered having a block of non-volatile memory cells undergo a particular manufacturing process subsequent to performance of a memory operation (e.g., a write, read, and/or erase operation associated with the block of non-volatile memory cells) can exacerbate an impact of the particular manufacturing process on the block of non-volatile memory cells and can have a lasting impact on the health characteristic values of a block of non-volatile memory cells.

For example, a block of non-volatile memory cells that is has undergone a manufacturing process (e.g., soldering) may experience an increased amount/rate of data degradation, relative to other blocks of non-volatile memory cells, which have not undergone the manufacturing process (e.g., an IR reflow soldering process or other processes that can affect the quality and/or lifetime of memory dies and/or blocks that form a memory die). As such, the block of non-volatile memory cells that has undergone a manufacturing process can have a manufacturing process factor value that is greater than a manufacturing process factor value of a block of non-volatile memory cells that has not undergone the manufacturing process. Similarly, a block of non-volatile memory cells that has undergone particular manufacturing processes subsequent to undergoing a memory operation can have a manufacturing process factor value that is greater than a manufacturing process factor value of a block of non-volatile memory cells that has not undergone particular manufacturing processes subsequent to undergoing a memory operation.

In some embodiments, the effective health factor includes a topology factor. As used herein, a "topology factor" refers to an indicator of a physical location of a block of non-volatile memory cells in an apparatus, a relative location of a die (in which the block of non-volatile memory cells is included) in the apparatus, or both. In some examples, a value of a topology factor can indicate a relative location of a block of non-volatile memory cells in a die. For instance, a value of a topology factor can indicate a proximity or distance to an edge, mid-point, or other physical location on a die in which the block of non-volatile memory cells is included.

For example, a value of the topology factor can be indicative of a distance between a block of non-volatile memory cells and a physical edge of a die in which the block of non-volatile memory cells is included. In such instances, a block of non-volatile memory cells that is closer to the edge of the die can have a different topology factor value than another block of non-volatile memory cells that is further from the edge of the die. Having different topology factor values can account for impact on the health characteristic values of the blocks of non-volatile memory cells due to differences in topology. For example, a block of non-volatile memory cells that is closer to an edge of a die may experience an increased amount/rate of data degradation, relative to other blocks of non-volatile memory cells, which are further from the edge of the die. In such an example, the block of non-volatile memory cells that is closer to the edge of the die can have a topology factor value that is greater than a topology factor value of a block of non-volatile memory cells that is further from the edge of the die and vice versa. In this way, increasing values (e.g., those that are greater than "1") can indicate a degree of proximity to an edge of the die, among other possibilities.

In some embodiments, the effective health factor can include a test factor. As used herein, a "test factor" refers to an indicator of a post-manufacture performance of a block of non-volatile memory cells. The test factor can determine a base performance characteristic of a block of non-volatile memory cells. A value of the test factor can, for example, be determined initially following manufacture of a die in which a block of non-volatile memory cells is included.

A test factor can be indicative of a reliability test conducted on a block of non-volatile memory cells such as those on an individual die. Examples of reliability tests include those that test for various errors (e.g., read/write errors) and/or those that test for corrupted or incorrect data values. In some examples, the test factor can indicate a particular reliability test performance of a block of non-volatile memory cells. As such, a block of non-volatile memory cells that has a low reliability test performance (e.g., has more corrupted or incorrect data) can have a different test factor value than another block of non-volatile memory cells. Thus, test factor values can account for impacts on the health characteristic values of the blocks of non-volatile memory cells due to differences in tested performance of the blocks of non-volatile memory cells. For example, a block of non-volatile memory cells that has a low reliability test performance may experience an increased amount/rate of data degradation, relative to other blocks of non-volatile memory cells, which having higher reliability test performance. As such, the block of non-volatile memory cells that has a low reliability test performance can have a test factor value that is greater than a test factor value of a block of non-volatile memory cells that has a higher reliability test performance and vice versa.

Further, as mentioned, some embodiments can include performing aspects of effective access count based media management to select a sub-set of dies from multiple dies of a memory device and/or memory sub-system. The sub-set can be selected for inclusion into an apparatus. In this way, manufacturing yields for the dies can be increased, for instance, by utilizing some dies with a lower reliability characteristic (relative to other dies of the sub-set of dies) into the sub-set of dies. Yet, such selection of the sub-set of dies can ensure that an aggregate quality (e.g., an average quality or sum of qualities of the various dies) of the sub-set of dies meets a criterion. For instance, a sub-set of dies can be selected with each die having a given performance such that the sub-set of dies has an aggregated or average performance meets (e.g., is greater than) a reliability test criterion. As used herein, meeting a criterion can be a threshold. In such instance, meeting a criterion can refer to a value exceeding or being lower than a threshold.

In some embodiments, the at least one effective health factor further can include a run-time factor. As used herein, a "run-time factor" refers to an indicator of run-time performance of a block of non-volatile memory cells included in a memory array in an electronic device. For instance, a run-time factor can be indicative of a reliability test conducted on a block of non-volatile memory cells during or subsequent to an end user operation of an electronic device. As such, the run-time factor can determine an actual performance characteristic of the block of non-volatile memory cells. The run-time factor can vary and can be updated over the operational lifetime of a block of non-volatile memory cells. A block of non-volatile memory cells that has a low run-time reliability performance (e.g., has more corrupted or incorrect data) can have a different run-time factor value than another block of non-volatile memory cells. The run-time factor values can account for any impact on the health characteristic values of the blocks of non-volatile memory cells due to differences in actual run-time tested performance of the blocks of non-volatile memory cells. For example, a block of non-volatile memory cells that has a low reliability test performance during run-time operation can experience an increased amount/rate of data degradation, relative to other blocks of non-volatile memory cells, which can have higher reliability test performance during run-time operation. As such, the block of non-volatile memory cells that has a low reliability test performance during run-time operation can have a run-time factor value that is greater than a run-time factor value of a block of non-volatile memory cells that has a higher reliability test performance during run-time of an electronic device with a memory array in which the block of non-volatile memory cells is included and vice versa.

In some embodiments, the effective access count based media management component 113 can be further configured to perform a media management operation involving a block of non-volatile memory cells of the blocks of non-volatile memory cells. For instance, the effective access count based media management component 113 can perform a media management operation involving a block of non-volatile memory cells based on the effective respective health characteristic values. For example, the effective access count based media management component 113 can perform a media management operation involving a block of non-volatile memory cells that has an effective respective access count meets a health criterion.

That is, the effective access count based media management component 113 can be further configured to determine that a block of non-volatile memory cells (e.g., a physical block and/or logical block of non-volatile memory cells) exhibits a health characteristic value that meets a health criterion. As used herein, "health characteristic values" generally refer to quantifiable attributes of memory cells in a block of non-volatile memory cells that correspond to the quality, life expectancy, and/or other attributes of the memory cells that can affect the ability of the memory cells to accurately store data. Non-limiting examples of health characteristics or health metrics can include a raw bit error rate (RBER) associated with the memory cells, wear leveling characteristics associated with the memory cells, and/or a total quantity of program-erase cycles the memory cells have been subjected to, among others. As such, various scans such as a background scan, a RBER scan, a read scan, and/or an integrity scan can be employed to determine a given heath characteristic value. For instance, determination of the health characteristic value can include determination of at least one of a PEC count, an erase count, an age, or any combination thereof, of a block of non-volatile memory cells.

The effective access count based media management component 113 can be further configured to selectively perform a media management operation involving a block of non-volatile memory cells. Selectively performing the media management operation can occur in response to the determination that the block of non-volatile memory cells exhibits a health characteristic value that meets the health criterion. For instance, in some embodiments, the effective access count based media management component 113 can be further configured to perform a block refresh of data stored in a block of non-volatile memory cells. As mentioned, when employed in conjunction with other aspects herein performing the block refresh can mitigate data degradation issues.

Figure 2:
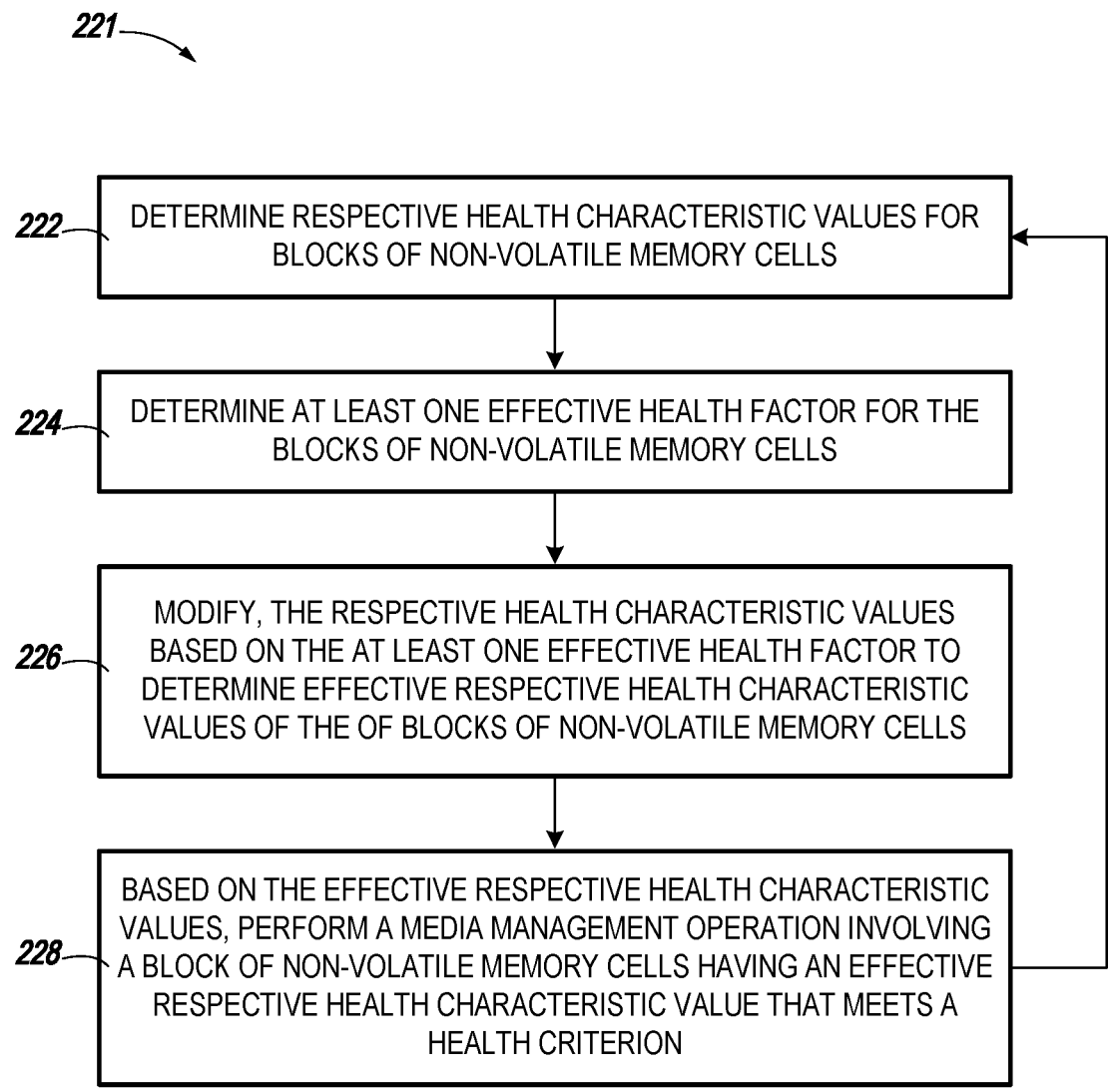
FIG. 2 illustrates a flow diagram corresponding to effective access count based media management in accordance with some embodiments of the present disclosure.

FIG. 2 illustrates a flow diagram corresponding to effective access count based media management in accordance with some embodiments of the present disclosure. The flow 221 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow 221 is performed by the effective access count based media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 222, a health characteristic value can be determined for one or more blocks of non-volatile memory cells. For instance, a respective access count such as a respective PEC count of blocks of non-volatile memory cells can be determined. For instance, a PEC count of a respective block of NAND memory cells can be determined, among other possibilities. In some embodiments, the PEC count or other health characteristic value can be a value that is written to and/or stored in a data structure such as a table (e.g., a look-up table) or is otherwise written to, stored, or otherwise accessible to the memory sub-system and can be incremented in response to operations described herein. In some embodiments, a health characteristic can be determined for some or all components of the memory sub-system (e.g., the memory sub-system 110 illustrated in FIG. 1, herein) by a media management component, such as the effective access count based media management component 113 illustrated in FIG. 1.

In some embodiments, respective access counts for blocks of non-volatile memory cells can be determined. Examples of access counts include a total quantity of read operations, a total quantity of write operations, a total quantity of erase operations, a PEC count, or any combination thereof. The respective access counts can vary over a lifetime of an apparatus (e.g., a memory sub-system) including the blocks of non-volatile memory cells. For instance, a respective PEC count value can be stored in a table or other data structure that can be incremented responsive to a program-erase cycle. Each block of non-volatile memory cells can have a respective access count such as a respective PEC count that is associated therewith. For example, physical blocks of non-volatile memory cells having respective physical addresses can each have a respective access count.

At operation 224, an effective health factor can be determined. For instance, a topology factor, a manufacturing process factor, a test factor, a run-time factor, any combination thereof, can be determined, as detailed herein. At operation 226, a respective health characteristic value (e.g., a respective access count) can be modified, based on the at least one effective health factor, to determine an effective respective health characteristic value (e.g., an effective respective access count) for the blocks of non-volatile memory cells.

In some embodiments, the effective health factor can have a value that is greater than 1. In such instances, modification of the respective health characteristic value (e.g., as represented by "X") can include multiplying the respective health characteristic value by the effective health factor (e.g., a test factor with a value of "1.5") to determine the resultant effective respective health characteristic value (e.g., which is equal to 1.5*X). As such, a determined health characteristic value such as a respective access count (e.g., a PEC count) can be increased based on a value of at least one effective health factor (e.g., a manufacturing process factor, etc.) to determine the effective health characteristic value. While described above with respect to an individual effective health factor the total quantity of effective health factors can be increased (e.g., 2, 3, etc.) and, in such instances, the respective access count can be modified by (e.g., multiplied by) each of the effective health factors.

At operation 228, a media management operation can be performed on a block of non-volatile memory cells. For instance, a media management operation can be performed on a block of non-volatile memory cells having an effective respective health characteristic value (e.g., an effective respective access count) that meets a health criterion. For instance, in some embodiments, a media management operation can involve a block of non-volatile memory cells that has a highest an effective respective access count, among other possibilities.

In some embodiments, a media management operation can be performed on a block of non-volatile memory cells that has a respective health characteristic value (e.g., a respective access count) that is does not meet (e.g., is less than) a health criterion, but that has an effective health characteristic value (e.g., an effective respective access count) that meets (e.g., is greater than) the health criterion. Thus, different base performance characteristics (e.g., different test factor values, different topology factor values, and/or different manufacturing process values) and/or different actual performance characteristics (e.g., different real-time factor values) can be accounted for when selecting a block to for a media management operation, in contrast to other approaches such as those that rely solely on a determined PEC count to select blocks for media management operations.

Figure 3:
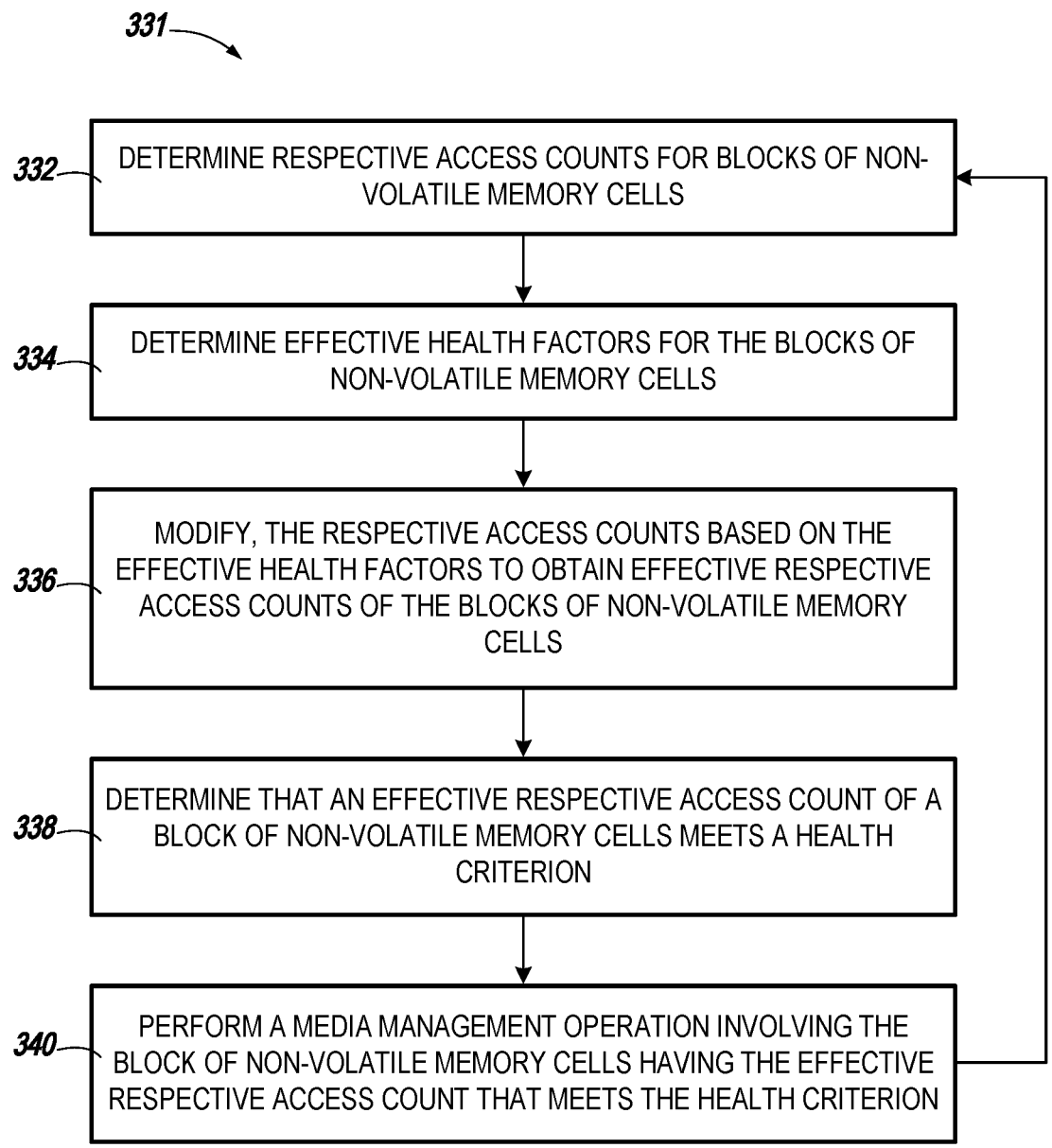
FIG. 3 illustrates another flow diagram corresponding to effective access count based media management in accordance with some embodiments of the present disclosure.

FIG. 3 illustrates a diagram of a flow 331 corresponding to effective access count based media management in accordance with some embodiments of the present disclosure. The flow 331 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the flow 331 is performed by the effective access count based media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 332, respective access counts can be determined for blocks of non-volatile memory cells. The access counts can include respective health characteristic values, as described herein. For instance, at least one of a PEC count, an erase count, an age, or any combination thereof, of a respective block of non-volatile memory cells, can be determined. In some embodiments, a health characteristic value can be determined for some or all components of the memory sub-system (e.g., the memory sub-system 110 illustrated in FIG. 1, herein) by a media management component, such as the effective access count based media management component 113 illustrated in FIG. 1.

At operation 334, at least one effective health factor can be determined, as detailed herein. At operation 336, an effective respective health characteristic value such an effective respective access count can be determined. For instance, the effective health characteristic can be determined by modifying a respective health characteristic value such as a respective access count. The respective health characteristic value can be modified based on the effective health factors. For example, a determined health characteristic value such as a respective access count (e.g., a respective PEC count) can be increased based on a value of at least one effective health factor (e.g., a manufacturing process factor) to determine the effective respective health characteristic value. That is, in various embodiments an effective respective health characteristic value can be greater than an initially determined respective health characteristic value. For instance, an effective PEC count can be greater than a corresponding determined PEC count. Accordingly, effective access count based media management can account for differences in physical block location, performance characteristics, and/or whether or not a block as undergone a memory operation subsequent to undergoing a processing step (e.g., an IR soldering operation), rather than relying solely on a given determined PEC count (e.g., an incrementally increasing PEC count) or random block selection for performance of a media management operation.

At operation 338, the effective respective health characteristic value can be compared to a health criterion to permit determination of whether the effective respective health characteristic value meets (e.g., is greater than or less than) the health criterion. For instance, an effective respective access count such as an effective respective PEC count can be compared to a PEC criterion to permit determination of whether the effective respective PEC count meets the PEC criterion. As used herein, a "PEC criterion" generally refers to a particular total number program-erase cycles. In some embodiments, the PEC criterion can be equal to 500, 1000, 1500, 2000, 3000, 4000, 5000 10,000, 50,000, or 100,000 program-erase cycles, among other possible values.

If, it is determined that the health characteristic value does not meet a health criterion, then the flow 331 can return to operation 332. If, however, it is determined that the health characteristic value meets the health criterion, then the flow 331 can proceed to operation 340. At operation 340, a media management operation can be performed. For instance, based on a health characteristic value such as an effective respective PEC count meeting a health criterion (e.g., a PEC criterion), a media management operation can be performed on a block of non-volatile memory cells. The non-volatile memory cells can be NAND memory cells, NOR memory cells, or both. Subsequent to performance of the media management operation, the flow 331 can return to operation 332.

Figure 4:
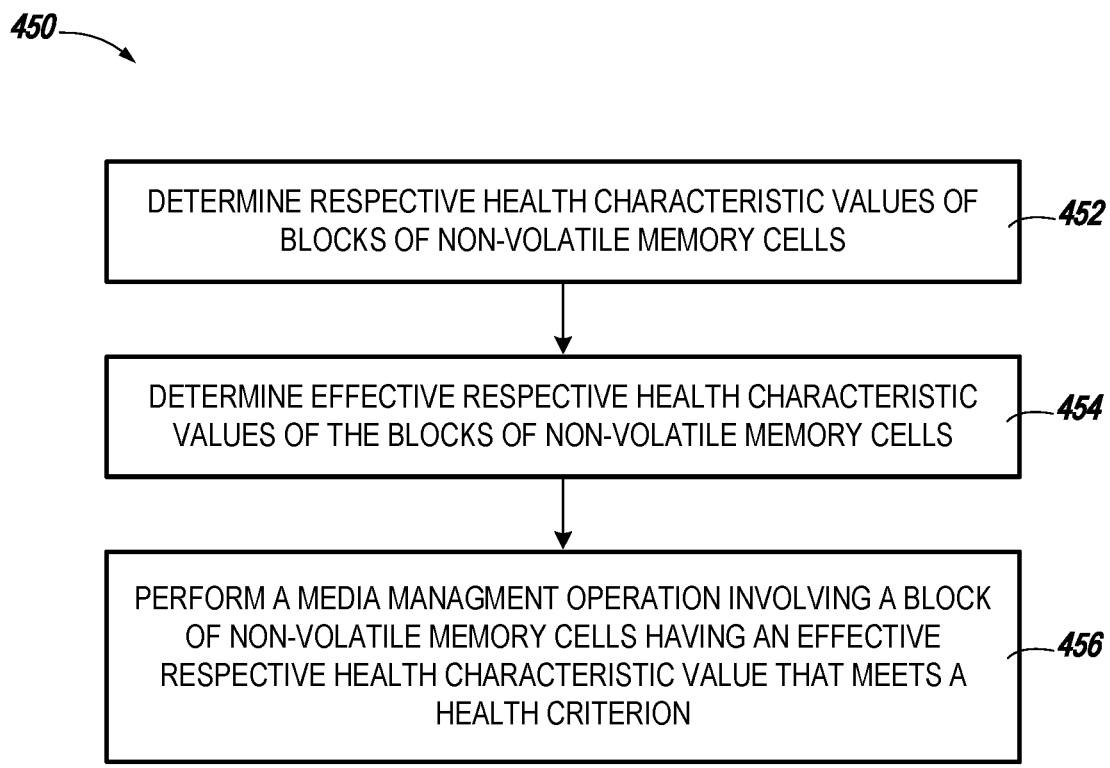
FIG. 4 illustrates a flow diagram corresponding to a method for effective access count based media management in accordance with some embodiments of the present disclosure.

FIG. 4 is flow diagram corresponding to a method 450 for effective access count based media management in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the effective access count based media management component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 452, a health characteristic value (e.g., a PEC count) or other health characteristic value of a block of non-volatile memory cells can be determined. For instance, a respective health characteristic value such as a respective PEC count can be determined for each physical block, each logical block, or both, in a memory sub-system. In some embodiments, the memory sub-system can be analogous to the memory sub-system 110 illustrated in FIG. 1. As described above, the memory components can be memory dies or memory packages that are coupled to one another to create an array of memory cells, such as a three-dimensional stackable cross-gridded array of memory cells used by the memory sub-system to store data.

The method 450 can include determining the effective access counts subsequent to user use of an electronic device including an array having a blocks of non-volatile memory cells, determining the effective access counts prior to shipment of the electronic device, or both. As used herein, the phrase "user use" of an electronic device refers to an end user causing an operation such as host access of a block of non-volatile memory cells in the electronic device. As used herein, the phrase "prior to shipment" refers to manufacture or other testing performed prior to an electronic device being shipped to a point of sale and/or an end-user. The effective health factors values can be determined and, in some instances, updated over a lifetime of an electronic device. For instance, a test factor values, a manufacturing process factor values, and/or topology factor values can be determined prior to shipment of an electronic device including blocks of non-volatile memory cells, while run-time factor values can be determined subsequent to user use of an electronic device, among other possibilities.

In some embodiments, the respective health characteristic values such as the respective access counts can be modified by an amount that meets (e.g., is less than or greater than) a modification criterion. For instance, a modification criterion may be a percentage that is based on an advertised capability and/or designed capability of an array and/or an electronic device. For instance, a given array can have an advertised and/or designed capability such as being intended to operate in a given manner at least until the occurrence of a quantify (e.g., 100,000) PEC cycles. As such, any modification of the respective access counts of a block of non-volatile memory (and any subsequent media management operation performed on the block of non-volatile memory cells) can be constrained to ensure the array remains within a given amount of the advertised capability and/or designed capability. For instance, any modification of the respective access count of a block of non-volatile memory prior to shipment (e.g., prior to use of the electronic device by an end-user) can be constrained by way of use of the modification criterion. A modification criterion can be within a given percentage of an advertised and/or designed value. Examples of suitable modification criterion values include various percentages such as 3%, 5%, 10%, 15%, 20%, 25%, or 50%, among other possible values.

At operation 454, effective respective health characteristic values of the blocks of non-volatile memory cells can be determined. As mentioned, the effective respective health characteristic values can be determined based on the respective health characteristic values and at least one effective health factor of the blocks of the non-volatile memory cells. The effective respective health characteristic values of the blocks of non-volatile memory cells can be determined responsive to determination of a PEC count or other health characteristic value of a block of non-volatile memory cells, as 452. However, in some examples, the effective respective access counts of the blocks of non-volatile memory cells can be determined responsive to determination of at least one effective health factor. Thus, in some embodiments, the effective respective health characteristic value of a block of non-volatile memory cells can be determined responsive to a determination of (or change in) a respective health characteristic value, a determination of (or change in) a value of an effective health factor, or both.

The effective respective health characteristic values, such as an effective respective PEC count, can accurately represent a level by which an age of the blocks of non-volatile memory cells has increased over a period of time, in contrast to other approaches such as those that rely solely based on PEC counts. Accurately representing the level by which an age of the blocks of non-volatile memory cells has increased can permit the selective and accurate application of memory management operations (e.g., those employing a block refresh) on the blocks of non-volatile memory cells that, due to having higher effective respective health characteristic values, may be prone to data degradation issues and thereby improve performance of a memory sub-system (e.g., mitigating read failures and/or a return a corrupted or incorrect data value), in contrast to other approaches which do not employ effective access count based memory management.

At operation 456, the method 450 can include performance of a media management operation involving a block of non-volatile memory cells having an effective respective access count that meets a health criterion. For instance, an effective respective health characteristic value can be determined at operation 454, and a subsequent determination can be made whether or not the effective respective health characteristic value is greater than a health criterion, as detailed herein. For example, based on the PEC count of a block of non-volatile memory cells (e.g., a block of NAND memory cells) being greater than a corresponding health criterion (a PEC criterion), a media management operation can be performed on the block of non-volatile memory cells.

In some embodiments, a block refresh can be performed on a block of non-volatile memory cells responsive to a determination that the block of non-volatile memory cells has an effective respective health characteristic value that meets a health criterion. As used herein, a block refresh generally refers to the copying of data from one portion of a NAND device to another, such as copying data written to one block of memory cells to another block of memory cells. In some embodiments, the block refresh can be part of a media management operation such as a garbage collection operation, static and/or dynamic wear-leveling, etc. Performing the block refresh on the block of non-volatile memory cells determined to have an effective respective health characteristic value that is meets a health criterion can mitigate the above mentioned data degradation issues, in contrast to other approaches that do not employ effective access count based media management.

Figure 5:
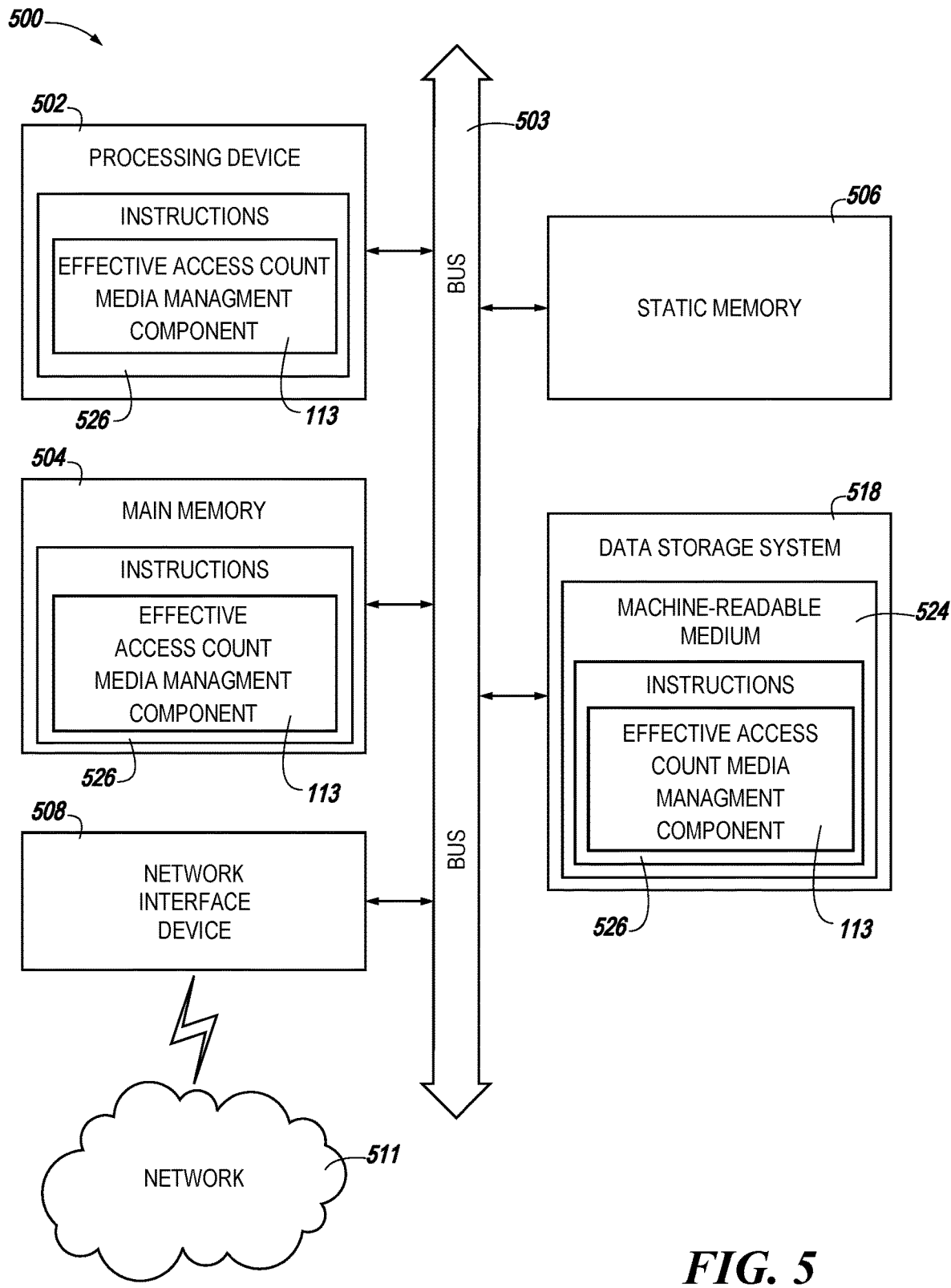
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the effective access count based media management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 503.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 511.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a media management component (e.g., the effective access count based media management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising: determining respective program-erase cycle (PEC) counts of blocks of non-volatile memory cells, wherein the blocks of non-volatile memory cells are NAND memory cells, or NOR memory cells, or both; determining at least one effective health factor of each of the blocks of the non-volatile memory cells, wherein the at least one effective health factor comprises a topology factor indicative of a distance of a block of non-volatile memory cells to a die edge and a manufacturing process factor indicative of whether the block of non-volatile memory cells has undergone a soldering process; in response to the determination of the topology factor and the manufacturing process factor of each of the blocks of non-volatile memory cells, modifying the respective PEC counts to generate effective respective PEC counts of the blocks of non-volatile memory cells; and based on the effective respective PEC counts of the blocks of non-volatile memory cells, performing a media management operation involving the block of non-volatile memory cells of the blocks of non-volatile memory cells having the effective respective PEC count that meets a health criterion.

2. The method of claim 1, wherein the manufacturing process factor is indicative of whether the block of non-volatile memory cells has undergone the soldering process subsequent to performance of a memory operation associated with the block of non-volatile memory cells.

3. The method of claim 2, wherein the PEC counts correspond to a total quantity of write operations, a total quantity of read operations, a total quantity of erase operations, a total quantity of program-erase cycles, or any combination thereof.

4. The method of claim 2, wherein the soldering process further comprise an infrared (IR) reflow soldering process.

5. The method of claim 1, wherein a status of a flag, a bit pattern, a value stored in a bit, or a value stored in a table is indicative of an increased effective respective PEC count of the block of non-volatile memory cells when the block of non-volatile memory cells has undergone the soldering process.

6. The method of claim 1, wherein the topology factor is indicative of a physical location of the block of non-volatile memory cells relative to the die edge.

7. The method of claim 6, wherein a value of the topology factor is indicative of the distance from the block of non-volatile memory cells to a physical edge of a die in which the block of non-volatile memory cells is included.

8. The method of claim 1, wherein the effective health factor further comprises a test factor, a run-time factor, or both.

9. An apparatus, comprising: an effective access count media management component configured to: determine respective program-erase cycle (PEC) counts of a plurality of blocks of non-volatile memory cells wherein the plurality of blocks of non-volatile memory cells are NAND memory cells, or NOR memory cells, or both; determine at least one effective health factor of each of the plurality of blocks of non-volatile memory cells, wherein the at least one effective health factor comprises a topology factor indicative of a distance of a block of non-volatile memory cells to a die edge and a manufacturing process factor indicative of whether the block of the plurality of non-volatile memory cells has undergone a soldering process prior to shipment of an electronic device including the plurality of non-volatile memory cells; in response to the determination of the topology factor and the manufacturing process factor of each of the plurality of blocks of non-volatile memory cells, modify the respective PEC counts to generate effective respective PEC counts of the plurality of blocks of non-volatile memory cells; and based on the effective respective PEC counts of the blocks of memory cells, perform a media management operation involving the block of non-volatile memory cells having the effective respective PEC count that meets a health criterion.

10. The apparatus of claim 9, wherein the at least one effective health factor further includes the topology factor, a test factor, a run-time factor, or any combination thereof.

11. The apparatus of claim 9, wherein the PEC counts correspond to a total quantity of write operations, a total quantity of read operations, a total quantity of erase operations, a total quantity of program-erase cycles, or any combination thereof.

12. The apparatus of claim 9, further comprising determining the effective respective PEC counts subsequent to end user use of an electronic device including the plurality of blocks of non-volatile memory cells.

13. The apparatus of claim 9, further comprising determining the effective respective PEC counts prior to the shipment of the electronic device including the plurality of non-volatile memory cells.

14. The apparatus of claim 13, wherein the effective access count media management component is configured to modify the respective PEC counts based on a modification criterion.

15. A system, comprising: a plurality of memory components arranged to form a stackable cross-gridded array comprising a plurality of blocks of non-volatile memory cells, wherein the plurality of blocks of non-volatile memory cells are NAND memory cells, or NOR memory cells, or both; and a processing device coupled to the plurality of memory components, the processing device to perform operations comprising: determining respective program-erase cycle (PEC) counts of the plurality of blocks of non-volatile memory cells; determining at least one effective health factor of each of the plurality of blocks of non-volatile memory cells, wherein the at least one effective health factor further comprises a topology factor, and a manufacturing process factor indicative of whether a block of non-volatile memory cells has undergone a soldering process prior to shipment of the system; in response to the determining of the topology factor and the manufacturing process of each of the plurality of blocks of non-volatile memory cells, modifying the respective PEC counts of the plurality of blocks to generate effective respective PEC counts; and based on the effective respective PEC counts of the plurality of blocks, performing a media management operation involving the block of non-volatile memory cells having the effective PEC count that meets the health criterion.

16. The system of claim 15, wherein the plurality of memory components are resident on a mobile computing device.

17. The system of claim 15, wherein the effective respective PEC counts represent a level by which an age of the plurality of blocks of non-volatile memory cells has increased over a period of time.

18. The system of claim 15, wherein the topology factor is indicative of a distance from the block of non-volatile memory cells to a physical edge of a die in which the block of non-volatile memory cells is included.

* * * * *